United States Patent Office 3,784,555
Patented Jan. 8, 1974

3,784,555
CERTAIN OXADIAZOLYL AND THIADIAZOLYL AMIDINES
Tony Cebalo, Indianapolis, and Robert Edward Buntrock, Munster, Ind., assignors to Air Products and Chemicals, Inc., Allentown, Pa.
No Drawing. Filed Nov. 5, 1970, Ser. No. 87,298
Int. Cl. C07d 85/54, 91/62
U.S. Cl. 260—306.8 D          10 Claims

ABSTRACT OF THE DISCLOSURE

This invention relates to novel amidines of the general formula:

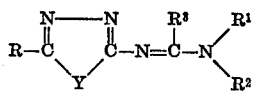

wherein R, $R^1$, $R^2$, $R^3$ and Y are as hereinafter defined. Methods for using these compounds as agricultural chemicals, and formulations for pre- and post-emergent herbicidal applications are also disclosed.

BACKGROUND OF THE INVENTION (1) Field of the invention

This invention relates to certain novel amidines and to compositions and methods for their use as agricultural chemicals.

(2) Description of the prior art

Certain formamidines are known to exhibit biological activity. For example, see U.S. Pats. 3,188,316; 3,121,084; 2,853,132; 3,284,289; and 2,521,358 describing formamidines as bactericides, herbicides, fungicides, acaricides, and germicides. However, the amidines of the subject invention present novel structures unrelated to known amidines.

SUMMARY OF THE INVENTION

The amidines of this invention are represented by the following general formula:

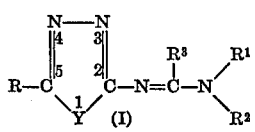

wherein Y represents oxygen or sulfur;
wherein R represents
 (a) hydrogen,
 (b) lower-alkyl of from 1 to 6 carbon atoms, such as methyl, ethyl, propyl, i-propyl, butyl, i-butyl, s-butyl, or t-butyl, n-pentyl or n-hexyl,
 (c) lower-cycloalkyl of from about 3 to 6 carbon atoms, such as cyclopropyl, cyclopentyl or cyclohexyl,
 (d) phenyl or substituted phenyl substituted with such as
  (1) halo, e.g. bromo, chloro, fluoro, iodo,
  (2) nitro,
  (3) trifluoromethyl,
  (4) lower-alkyl of from 1 to 4 carbons, as defined above,
  (5) lower-alkoxy of from 1 to 4 carbons,
  (6) di (lower-alkyl) amino, wherein the lower alkyl groups contain 1 to 4 carbons as defined before,
  (7) cyano,
 (e) lower-alkenyl of up to 6 carbon atoms, such as ethenyl, 2-propenyl, 1-propenyl, i-propenyl, 3-butenyl, 1-methyl-2-propenyl, 1-ethylethenyl, 1-butenyl, 1-pentenyl, 4-pentenyl, 3-pentenyl, 2-pentenyl, 1-ethyl-2-propenyl, 1-methyl-3-butenyl, 1-hexenyl, 2-hexenyl, 3-hexenyl, 4-hexenyl, 5-hexenyl, 1-methyl-4-pentenyl, 1-ethyl-3-butenyl, 1-propyl-2-propenyl, and any isomers of any of the foregoing,
 (f) substituted lower-alkyl of from 1 to 6 carbons, substituted with such as
  (1) halo such as bromo, chloro, fluoro or iodo; exemplary are

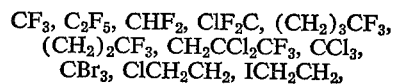
   $CF_3$, $C_2F_5$, $CHF_2$, $ClF_2C$, $(CH_2)_3CF_3$,
   $(CH_2)_2CF_3$, $CH_2CCl_2CF_3$, $CCl_3$,
   $CBr_3$, $ClCH_2CH_2$, $ICH_2CH_2$, (2) phenyl,
  (3) lower-cycloalkyl of from 3 to 6 carbons such as defined before,
  (4) heterocyclic of from 5 to 6 ring atoms such as pyridyl or furyl,
 (g) halo such as fluoro, chloro or bromo,
 (h) lower-alkoxy of 1 to 4 carbons;
wherein $R^1$ represents
 (a) hydrogen,
 (b) lower-alkyl of from 1 to 6 carbon atoms such as methyl, ethyl, propyl, i-propyl, butyl, i-butyl, s-butyl, or t-butyl, n-pentyl or n-hexyl,
 (c) lower-cycloalkyl of from about 3 to 6 carbon atoms, such as cyclopropyl, cyclopentyl or cyclohexyl, except that when $R^2$ is lower-cycloalkyl, $R^1$ is a group, as defined, other than lower-cycloalkyl,
 (d) substituted lower-alkyl of from 1 to 6 carbons substituted with such as
  (1) halo, e.g. bromo, chloro, fluoro or iodo; exemplary being

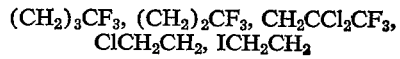
   $(CH_2)_3CF_3$, $(CH_2)_2CF_3$, $CH_2CCl_2CF_3$,
   $ClCH_2CH_2$, $ICH_2CH_2$ (e) lower-alkoxy of 1 to 4 carbons,
 (f) lower-alkenyl of up to 6 carbon atoms, such as ethenyl, 2-propenyl, 1-propenyl, i-propenyl, 3-butenyl, 1-methyl-2-propenyl, 1-ethylethenyl, 1-butenyl, 1-pentenyl, 4-pentenyl, 3-pentenyl, 2-pentenyl, 1-ethyl-2-propenyl, 1-methyl-3-butenyl, 1-hexenyl, 2-hexenyl, 3-hexenyl, 4-hexenyl, 5-hexenyl, 1-methyl-4-pentenyl, 1-ethyl - 3 - butenyl, 1-propyl-2-propenyl, and any isomers of any of the foregoing;

wherein R² represents (a) hydrogen,
(b) lower-alkyl of from 1 to 6 carbon atoms such as methyl, ethyl, propyl, i-propyl, butyl, i-butyl, s-butyl, or t-butyl, n-pentyl or n-hexyl,
(c) lower-cycloalkyl of from 3 to 6 carbon atoms, such as cyclopropyl, cyclopentyl or cyclohexyl, except that when R¹ is lower-cycloalkyl, R² is a group, as defined, other than lower-cycloalkyl,
(d) when R¹ and R² each represents lower-alkyl, they can be linked together through the nitrogen of the amidine group to which they are attached to form a heterocyclic ring such as piperidyl or pyrrolidino;

and wherein R³ represents (a) hydrogen, or
(b) lower-alkyl of from 1 to 4 carbon atoms such as methyl, ethyl, propyl, i-propyl, butyl, i-butyl, s-butyl, or t-butyl.

DETAILED DESCRIPTION OF THE INVENTION

The novel compounds of this invention can be prepared by conventional methods. For example they can be produced according to the following general equation wherein R, R¹, R², R³ and Y are as defined above.

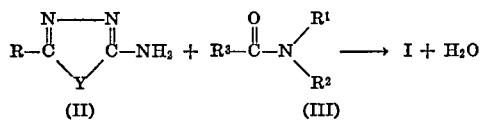

The reaction of the amine of Formula II with the amide of Formula III is carried out in the presence of a phosphorus oxyhalide, preferably phosphorus oxychloride. The reaction is generally carried out by admixing the amide and phosphorus oxyhalide in an inert organic solvent, such as benzene, by addition of an excess of the amide to the phosphorus oxychloride. To this mixture is then preferably added a solution of the amino Compound II. The reaction is preferably carried out under stirring and with water bath cooling. An excess of amide to amino compound is generally employed. (The amide can in some cases be used as a solvent, as well.) The phosphorus oxychloride is generally employed in a slight molar excess to the amino compound. The amidine product (I) is obtained as the hydrochloride salt which can conventionally be converted to the free base, as by stirring with an aqueous solution of alkaline base such as sodium bicarbonate, sodium hydroxide and the like, followed by filtration. The compounds of this invention in their salt or free base form exhibit the desired biological activity. Thus included within the scope of this invention are the acid addition salts of the compounds of the Formula I such as the hydrochloride salt, or any other acid addition salt which may be useful in formulating the compounds of this invention into useful compositions for end-use applications.

The novel compounds of the Formula I thus prepared, are useful as agricultural chemicals as they possess pronounced phytotoxic characteristics, often with surprising species selectivity, e.g. they destroy noxious weeds while valuable crops are not attacked. The novel compounds of this invention when formulated at proper dosage application levels into herbicidal compositions find usefulness in both pre-emergent and post-emergent applications. In those cases where species selectivity is not exhibited these compounds find usefulness as total herbicides, at higher rates of application, because of their pronounced phytotoxic activity. Furthermore, the compounds of this invention in certain instances possess useful biological properties which render them useful as algicides, insecticides, acaricides and fungicides when formulated in conventionally appropriate pesticidal or fungicidal compositions.

Among those compounds most preferred as herbicides are those of Formula I wherein Y is sulfur; R is a halogenated lower-alkyl, preferably fluorinated lower-alkyls such as $CF_3$ and $C_2F_5$, R¹, R², and R³ are hydrogen or lower-alkyl, it being especially preferred that R³ be hydrogen and R¹ and R² lower-alkyl. Especially valuable are N,N-dimethyl-N'-(5-trifluoromethyl-1,3,4-thiadiazol-2-yl) formamidine and N,N-dimethyl-N'-(5-pentafluoroethyl-1,3,4-thiadiazol-2-yl)formamidine which are excellent pre- and post-emergent herbicides.

The starting compounds of the Formula II wherein Y is sulfur can be prepared by reacting the appropriate carboxylic acid with the appropriate thiosemicarbazides, using polyphosphoric acid as a dehydrating agent, as described in the now abandoned application Ser. No. 37,836, filed May 15, 1970, of T. Cebalo et al. Those compounds of Formula II wherein Y is oxygen can be prepared by conventional methods. For example, ring closure of acylated thiosemicarbazides or semicarbazides can be effected using lead oxide, e.g. see U.S. Pat. No. 2,832,787.

The amides of Formula III are available as articles of commerce or can be prepared by conventional and known procedures. For example, they can be prepared by reacting the appropriate acid chloride or carboxylic acid esters with the selected amine.

The novel compounds of this invention and their preparation will be further illustrated by the following examples.

EXAMPLES 1

N,N-dimethyl-N'-(5-trifluoromethyl-1,3,4-thiadiazol-2-yl)formamidine

To a stirred solution of dimethylforamide (29.2 ml., 27.4 g., 0.230 mole) in dry benzene (50 ml.) is added, dropwise, with water bath cooling, a solution of phosphorus oxychloride (13.2 ml., 23.1 g., 0.151 mole) in dry benzene (50 ml.). The mixture is allowed to stand overnight. To this mixture is then added, dropwise, with stirring and water bath cooling, a solution of 2-amino-5-trifluoromethyl-1,3,4-thiadiazole (21.2 g., 0.125 mole) in dimethylformamide (35 ml.) and dry benzene (40 ml.). A solid appears which is isolated by filtration after 4 hrs. stirring. The solid is air-dried yielding N,N-dimethyl-N'-(5 - trifluoromethyl-1,3,4-thiadiazol-2-yl)formamidine hydrochloride (29.0 g., 0.111 mole, 89.0%), M.P. 190–193°.

The hydrochloride salt (7.00 g., 0.0269 mole) was stirred with 10% aq. sodium bicarbonate for several minutes and a white solid (4.12 g.) was isolated by filtration. Additional solid (1.40 g.) was recovered from the filtrate by evaporation and filtration. The total yield of N,N-dimethyl-N'-(5-trifluoromethyl-1,3,4-thiadiazol-2-yl)formamidine is 5.52 g. (0.246 mole, 91.5%; overall yield 81.4%), M.P. 65–65°.

Employing the method substantially as described in Example 1, but substituting for the thiadiazole and formamide reactants employed therein equivalent quantities of the 2-amino-5-R-1,3,4-thiadiazoles and the N,N-R¹,R² substituted formamides described in Table I, there are produced the N,N-R¹,R²-N'-(5-R-1,3,4-thiadiazol-2-yl)formamidines, also described in Table I, according to the reaction scheme illustrated therein.

TABLE I

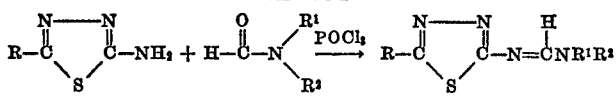

| | | | | Elemental analyses | | | | | |
|---|---|---|---|---|---|---|---|---|---|
| | | | | Calculated | | | Found | | |
| Ex. | R | R¹ | R² | M.P., degrees | C | H | N | C | H | N |
| 2 | CH₃ | CH₃ | CH₃ | 81–3 | 42.39 | 5.93 | 32.96 | 42.12 | 5.19 | 32.79 |
| 3 | C₂F₅ | CH₃ | CH₃ | 51–4 | 30.65 | 2.58 | 20.43 | 31.21 | 2.65 | 21.05 |
| 4 | CHF₂ | CH₃ | CH₃ | 74–8 | 34.98 | 3.93 | 27.20 | 34.99 | 3.85 | 26.97 |
| 5 | ClF₂C | CH₃ | CH₃ | 93–7 | 29.94 | 2.93 | 23.28 | 30.27 | 2.70 | 23.54 |
| 6 | (CH₃)₃C | CH₃ | CH₃ | 84–6 | 50.91 | 7.60 | 26.39 | 49.55 | 7.46 | 26.54 |

Another conventional method which can be employed to prepare the novel amidines of this invention is the reaction of the amine of Formula II with an amide acetal in accordance with the following reaction sequence:

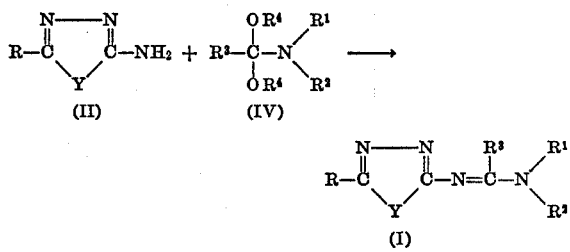

wherein R, R¹, R², R³ and Y are as previously defined and R⁴ is lower-alkyl, preferably methyl. This method is preferred as an alternate synthesis in cases where the amide (III) does not easily react with the amine (II). For example, when R³ in Formula I is methyl, it has been found that the appropriate amide acetal must be employed. The following example illustrates a reaction carried out with a preferred amide acetal of this invention.

EXAMPLE 7

N,N-dimethyl-N'-(5-trifluoromethyl-1,3,4-thiadiazol-2-yl)acetamidine

To a suspension of 2-amino-5-trifluoromethyl-1,3,4-thiadiazole (5.07 g.) in dry benzene (100 ml.) is added N,N-dimethylacetamide dimethylacetal (4.68 g.). This reaction mixture is refluxed for three hours and the resulting benzene solution is concentrated in vacuo to an oil, N,N-dimethyl-N'-(5-trifluoromethyl-1,3,4-thiadiazol-2-yl)acetamidine, having the following elemental analysis:

Calculated (percent): C, 35.29; H, 3.50; N, 23.51. Found (percent): C, 35.59; H, 3.89; N, 22.77.

As stated above, the compounds of this invention have utility as herbicides. The specific herbicidal application for which a particular compound of this invention is useful depends upon its phytotoxic properties and its selectivity. Various of them can be utilized as herbicides in typical pre-emergence and/or post-emergence application to vegetation to be controlled. Others can be applied to weeds or crops for defoliation or desiccation. Selected compounds can be utilized to achieve vegetation control for a relatively short period of time, or for total herbicidal applications at higher concentrations. The compounds can be used in various states of purity ranging, for example, from crystals to a technical crude grade. Suitable solvents for these compounds include alcohols, aqueous alcohol solutions and ketones including acetone and methyl isobutyl ketone.

When utilized for herbicidal purposes, compounds of the invention can be formulated in a variety of ways and concentrations for application to the locus for desired vegetation control. It is recognized that the particular type of concentration of formulation, as well as the mode of application of the active ingredient, can govern its biological activity in a given application.

Compounds of the invention can be prepared as simple solutions of the active ingredient in an appropriate solvent in which it is completely soluble at the desired concentration. Such solvent systems include water, alcohols, acetone, aqueous alcohol and acetone, and other organic solvents. These simple solutions can be further modified by the addition of various surfactants, emulsifying or dispersing agents, colorants, odorants, anti-foaming agents, other herbicides or herbicidal oils which supplement or synergize the activity of the herbicides of the invention, or other adjuvants for any given application where deemed desirable to impart a particular type or degree of plant responses.

Compounds of the invention can also be formulated in various other types of formulations commonly recognized by those skilled in the art of agricultural or industrial chemicals. These formulations include, for example, compositions containing the active ingredient as granules of relatively large particle size, as powder dusts, as wettable powders, as emulsifiable concentrates, or as a constituent part of any other known type of formulation commonly utilized by those skilled in the art. Such formulations include the adjuvants and carriers normally employed for facilitating the dispersion of active ingredient for agricultural and industrial applications of phytotoxicants. These formulations can contain as little as 0.25% or more than 95% by weight of the active ingredient.

Dust formulations are prepared by mixing the active ingredient with finely divided solids which act as dispersants and carriers for the phytotoxicant in applying it to the locus of application for vegetation control. Typical solids which may be utilized in preparing dust formulations of the active ingredients of the invention include talc, kieselguhr, finely divided clay, fuller's earth, or other common organic or inorganic solids. Solids utilized in preparing dust formulations of the active ingredient normally have a particle size of 50 microns or less. The active ingredient of these dust formulations is present commonly from as little as 0.25% to as much as 30% or more by weight of the composition.

Granular formulations of the active ingredients are prepared by impregnating or adsorbing the toxicant on or into relatively coarse particles of inert solids such as sand, attapulgite clay, gypsum, corn cobs or other inorganic or organic solids. The active ingredient of these granular formulations is commonly present from 1.0% to as much as 20.0% or more by weight of the composition.

Wettable powder formulations are solid compositions of matter wherein the active ingredient is absorbed or adsorbed in or on a sorptive carrier such as finely divided clay, talc, gypsum, lime, wood flour, fuller's earth, kieselguhr, or the like. These formulations preferably are made to contain 50% to 80% of active ingredient. These wettable powder formulations commonly contain a small amount of a wetting, dispersing or emulsifying agent to facilitate dispersion in water or other liquid carrier utilized to distribute the phytotoxicant to the locus of desired vegetation control.

Emulsifiable concentrate formulations are homogeneous liquid or paste compositions containing the active ingredient which will disperse in water or other liquid carrier to facilitate application of the phytotoxicant to the locus of desired vegetation control. Such emulsifiable concentrate formulations of the active ingredients can contain only the active ingredient with a liquid or solid emulsifying agent or may contain other relatively non-volatile organic solvents such as isophorone, dioxane, heavy aromatic naphthas, xylene, or dimethyl formamide. The active ingredient in such formulations commonly comprises 10.0% to 70.0% by weight of the phytotoxicant composition.

EXAMPLE 8

Tables II and III set forth the results obtained with various amidines of this invention, when tested for herbicidal activity in accordance with the following test procedure:

Pre-emergence and post-emergence

Six crop plant and six weed species are seeded in individual disposable four-inch square containers, watered only in amounts adequate to moisten soil and held for twenty-four hours before treatment. The crop plants used are sugar beets (subt), corn, oats, clover (clvr), soybeans (soyb), and cotton (cotn). The weeds employed are mustard (mstd), yellow foxtail (ylfx), barnyard grass (bngs), crab grass (cbgs), buckwheat (bkwt), and morning glory (mngy).

The foregoing crop plant and weed species are seeded by growth-time requirement schedules in individual disposable four-inch square containers, watered as required, and maintained under greenhouse conditions. When all crop plants and weeds have reached suitable growth development, generally first true leaf stage, plants and weeds appropriate to pertaining test requirements are selected for uniformity of growth and development. One four-inch container of each plant and weed, averaging six (corn) to fifty (crabgrass) or more plants or weeds per individual container, is then treated. Six crop and six weed containers are used in each evaluation.

Formulation and treatment

Candidate compounds are dissolved in acetone solution in suitable concentrations to achieve the dose/acre indicated in Tables II and III upon spray application at a rate of 40 gals./acre and 30 pounds pressure. Pre-emergence and post-emergence treatments are removed to the greenhouse and held for observation.

Observations

Pre-emergence and post-emergence treatments are observed daily for interim response, final observations being made fourteen days after treatment. Final responses are indicated in Tables II and III as an Herbicidal Numerical Injury Rating: 0—no visible effect; 1, 2, 3—slight injury, plant usually recovered with little or no reduction in top growth; 4, 5, 6—moderate injury, plants usually recovered, but with reduced top growth; 7, 8, 9—severe injury, plants usually did not recover; 10—all plants killed.

Observations include all abnormal physiological responses of stem bending, petiole curvature, epinasty, hyponasty, retardation, stimulation root development, necrosis and related growth regulant characteristics. In Tables II and III abbreviations for the observed plant injury and response are as follows: burn (B), chlorosis (Cl), normal (N), necrosis (Ne), no response (O), retarded or reduced (R), tip (Ti).

TABLE II

Pre-emergence herbicidal evaluation; injury rating:physiological response $$R-C(=N-)(-N=CNR_3R_3)$$ with $R_2$

| R | R¹ | R² | R³ | Dose, lbs./a. | Subt | Corn | Oats | Clvr | Soyb | Cotn | Mstd | Ylfx | Bngs | Cbgs | Bkwt | Mngy |
|---|---|---|---|---|---|---|---|---|---|---|---|---|---|---|---|---|
| CF₃ | CH₃ | CH₃ | H | 10 | 10:Ne | 10:Ne | 5:Ne | 10:Ne | 10:Ne | 10:Ne | 10:Ne | 9:Ne | 8:Ne | 10:Ne | 10:Ne | 10:Ne |
|  |  |  |  | 4 | 9:Ne | 1:Ne | 1:Ne | 7:Ne | 0:0 | 0:0 | 4:Ne | 7:Ne | 5:Ne | 5:Ne | 8:Ne | 0:0 |
|  |  |  |  | 2 | 8:Ne | 0:0 | 0:0 | 9:Ne | 0:0 | 0:0 | 7:Ne | 3:Ne | 4:Ne | 4:Ne | 7:Ne | 0:0 |
|  |  |  |  | 1 | 4:Ne | 0:0 | 0:0 | 8:Ne | 0:0 | 0:0 | 5:Ne | 3:Ne | 3:Ne | 3:Ne | 7:Ne | 0:0 |
| CF₃ | CH₃ | CH(HCl) | H | 10 | 10:Ne | 1:Ne | 2:Ne | 9:Ne | 9:Ne | 9:Ne | 10:Ne | 6:RNe | 8:RNe | 9:RNe | 10:RNe | 8:Ne |
| C₂F₆ | CH₃ | CH₃ | H | 10 | 10:Ne | 4:RNe | 2:Ne | 10:Ne | 10:Ne | 10:Ne | 10:Ne | 10:Ne | 10:Ne | 10:Ne | 10:Ne | 10:Ne |
|  |  |  |  | 4 | 10:Ne | 4:RNe | 2:RNe | 10:Ne | 9:Ne | 10:Ne | 10:Ne | 9:Ne | 10:Ne | 10:Ne | 8:RNe | 8:RNe |
|  |  |  |  | 2 | 10:Ne | 1:R | 1:RNe | 9:Ne | 9:Ne | 9:Ne | 10:Ne | 8:Ne | 10:Ne | 9:Ne | 10:Ne | 0:0 |
| CH₃ | CH₃ | CH₃ | H | 10 | 0:0 | 0:0 | 0:0 | 0:0 | 0:0 | 0:0 | 0:0 | 0:0 | 0:0 | 0:0 | 0:0 | 0:0 |
| CHF₂ | CH₃ | CH₃ | H | 4 | 1:Cl | 0:0 | 0:0 | 7:RNe | 1:Cl | 0:0 | 1:RNe | 0:0 | 0:0 | 0:0 | 1:Cl | 0:0 |

The following examples, set forth in Table IV, further demonstrate the novel formamidines of this invention. These compounds are produced by substituting for the thiadiazole and formamide reactants employed in Example 1, the appropriate 2-amino-5-R-1,3,4-thiadiazoles or 2-amino-5-R-1,3,4-oxadiazoles and the appropriate formamide described in Table IV, to produce the corresponding N,N - $R^1,R^2$-N'-(5-R-1,3,4-thiadiazol-2-yl)-$R^3$-formamidines or N,N-$R^1,R^2$-N'-(5-R-1,3-4-oxadiazol-2-yl)-$R^3$-formamidines, also set forth in Table IV, according to the reaction sequence therein.

TABLE IV

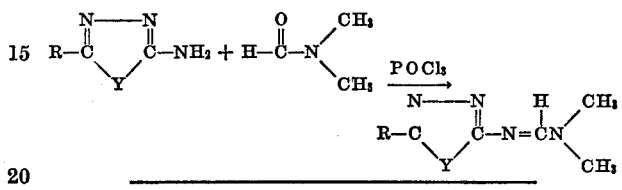

| R | Y |
|---|---|
| Example: | |
| 9 | H | S |
| 10 | H | O |
| 11 | Methyl | O |
| 12 | Ethyl | S |
| 13 | n-Propyl | O |
| 14 | n-Hexyl | S |
| 15 | 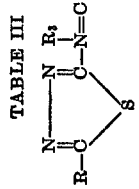 | S |
| 16 | Cyclohexyl | O |
| 17 | Phenyl | S |
| 18 | -pChlorophenyl | S |
| 19 | o-Bromophenyl | O |
| 20 | p-Trifluoromethylphenyl | S |
| 21 | o-Nitrophenyl | O |
| 22 | p-Fluorophenyl | S |
| 23 | p-tolyl | O |
| 24 | o-Methoxyphenyl | S |
| 25 | p-(Dimethylamino)phenyl | O |
| 26 | p-Cyanophenyl | S |
| 27 | Ethenyl | S |
| 28 | i-Propenyl | S |
| 29 | 1-Hexenyl | S |
| 30 | Trichloromethyl | S |
| 31 | do | O |
| 32 | do | S |
| 33 | do | O |
| 34 | Fluoro | S |
| 35 | Chloro | S |
| 36 | Bromo | S |
| 37 | Methoxy | S |
| 38 | n-Butoxy | O |

The examples set forth in Table V demonstrate other novel acetamidines of this invention. Employing the procedure of Example 7, but substituting for the thiadiazole and acetamide acetal reactants, equivalent quantities of the appropriate 2-amino-5-R-1,3,4-thiadiazoles, or 2-amino-5-R-1,3,4-oxadiazoles, and the N,N-$R^1,R^2$-substituted acetamide dimethyl acetals described in Table V, there are produced the corresponding N,N-$R^1,R^2$-N'-(5-R-1,3,4-thiadiazol-2-yl)acetamidines, or N,N-$R^1,R^2$-N'-(5-R-1,3,4-oxadiazol-2-yl)-acetamidines also described in Table V, according to the reaction scheme set forth in Table V.

TABLE V

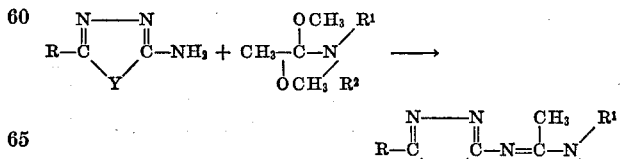

| R | $R^1$ | $R^2$ | Y |
|---|---|---|---|
| Example: | | | |
| 39 | H | Methyl | Methyl | S |
| 40 | H | do | do | O |
| 41 | Methyl | do | do | S |
| 42 | do | do | do | O |
| 43 | Trifluoromethyl | do | do | S |
| 44 | do | do | do | O |
| 45 | $C_2F_5$ | do | do | S |

TABLE V—Continued

| | R | R¹ | R² | Y |
|---|---|---|---|---|
| 46 | $C_2F_5$ | Methyl | Methyl | O |
| 47 | Difluoromethyl | do | do | S |
| 48 | do | do | do | O |
| 49 | Chlorodifluoromethyl | do | do | S |
| 50 | do | do | do | O |
| 51 | t-Butyl | do | do | S |
| 52 | do | do | do | O |
| 53 | H | Ethyl | Ethyl | S |
| 54 | H | do | Methyl | O |
| 55 | H | n-Butyl | n-Butyl | S |
| 56 | Trifluoromethyl | Ethyl | Ethyl | S |
| 57 | do | n-Propyl | n-Propyl | S |
| 58 | do | n-Butyl | n-Butyl | S |
| 59 | do | n-Hexyl | n-Hexyl | S |
| 60 | do | Methyl | Ethyl | S |
| 61 | do | do | Methyl | O |
| 62 | do | Ethyl | Ethyl | O |
| 63 | $C_2F_5$ | do | do | S |
| 64 | $C_2F_5$ | do | do | O |
| 65 | $C_2F_5$ | n-Hexyl | n-Hexyl | S |
| 66 | Cyclohexyl | Methyl | Methyl | S |
| 67 | Phenyl | do | do | O |
| 68 | p-Bromophenyl | do | do | S |
| 69 | Tribromomethyl | do | do | O |
| 70 | Fluoro | n-Propyl | do | S |
| 71 | Ethoxy | Methyl | do | O |

TABLE VI

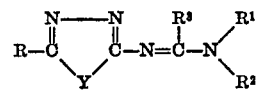

| Example: | R | Y | R¹ | R² | R³ |
|---|---|---|---|---|---|
| 72 | $CF_3$ | S | H | $CH_3$ | $CH_3$ |
| 73 | $CF_3$ | S | H | H | $CH_3$ |
| 74 | $CF_3$ | S | $CH_3$ | H | H |
| 75 | $CF_3$ | S | H | H | H |
| 76 | $CF_3$ | S | $C_2H_5$ | $C_2H_5$ | H |
| 77 | $CF_3$ | S | $CH_3CH_2CH_2$ | $CH_3CH_2CH_2$ | H |
| 78 | $CF_3$ | S | $CH_3(CH_2)_2CH_2$ | $CH_3(CH_2)_2CH_2$ | H |
| 79 | $CF_3$ | S | $CH_3CH_2CH_2$ | $CH_3$ | H |
| 80 | $CF_3$ | S | $CH_3$ | $CH_3$ | $C_2H_5$ |
| 81 | $CF_3$ | O | $CH_3$ | H | H |
| 82 | $CF_3$ | O | H | H | H |
| 83 | $CF_3$ | O | $CH_3$ | H | $CH_3$ |
| 84 | $CF_3$ | S | $CH_3$ | $CH_3$ | $CH_3CH_2CH_3$ |
| 85 | $CF_3$ | S | $CH_3$ | $CH_3$ | $(CH_3)_2CH$ |
| 86 | $C_2F_5$ | S | H | H | H |
| 87 | $C_2F_5$ | S | $CH_3$ | H | H |
| 88 | $C_2F_5$ | S | H | H | $CH_3$ |
| 89 | $C_2F_5$ | S | $CH_3$ | H | $CH_3$ |
| 90 | $C_2F_5$ | O | H | H | H |
| 91 | $C_2F_5$ | O | $CH_3$ | H | H |
| 92 | $C_2F_5$ | O | H | H | $CH_3$ |
| 93 | $C_2F_5$ | O | $CH_3$ | H | $CH_3$ |
| 94 | $CHF_2$ | S | H | H | H |
| 95 | $CHF_2$ | S | $CH_3$ | H | H |
| 96 | $CHF_2$ | O | H | H | H |
| 97 | $CHF_2$ | O | H | H | $CH_3$ |
| 98 | $CHF_2$ | O | H | H | $CH_3$ |
| 99 | $CH_3$ | S | H | H | H |
| 100 | $CH_3$ | S | $CH_3$ | H | H |
| 101 | $CH_3$ | S | $CH_3$ | H | $CH_3$ |
| 102 | $CH_3$ | S | H | H | $CH_3$ |
| 103 | $CF_3$ | S | $CH_3$ | $CH_3$ | (cyclopentenyl) |
| 104 | $CF_3$ | S | $CH_3$ | $CH_3$ | (phenyl) |
| 105 | $CF_3$ | S | $CH_3$ | $CH_3$ | $CH_2-CH=CH_2$ |
| 106 | $CF_3$ | S | $CH_3$ | $CH_3$ | (benzyl) |
| 107 | $CF_3$ | S | $CH_2Cl$ | H | H |
| 108 | $CF_3$ | S | H | H | (thiolanyl) |
| 109 | $CF_3$ | S | $CH_3$ | $CH_3$ | H |
| 110 | $CF_3$ | S | $-CH_2-CH_2^*$ $-CH_2-CH_2$ | | H |

*R¹ and R² linked together through nitrogen of the amidine moiety.

Further illustrative of the novel amidines of this invention are those set forth in Table VI. These compounds are produced by substituting for the thiadiazole and formamide reactants of Example 1, or thiadiazole and amide acetal reactants of Example 7, equivalent quantities of the appropriate 2-amino-5-R-1,3,4-thiadiazole or 2-amino-5-R-1,3,4-oxadiazole with the suitable amide or amide acetal.

What is claimed is:
1. A compound of the formula

$$R-C\underset{Y}{\overset{N-N}{\diagup\!\!\!\diagdown}}C-N=C(R^3)-N(R^1)(R^2)$$

wherein Y represents sulfur, R represents lower alkyl or halo lower alkyl and each of R¹, R² and R³ independently represents hydrogen or lower alkyl.

2. The compound of claim 1, where R is selected from $CF_3$, $C_2F_5$, $CHF_2$, $ClF_2C$, methyl and t-butyl.

3. The compound of claim 1, wherein Y is sulfur, R, R¹, R² are methyl and R³ is hydrogen.

4. The compound of claim 1, wherein Y is sulfur, R is trifluoromethyl, R¹ and R² are methyl and R³ is hydrogen.

5. The compound of claim 1, wherein Y is sulfur, R is trifluoromethyl, R¹ is methyl, R² is methyl·HCl, and R³ is hydrogen.

6. The compound of claim 1, wherein R is $C_2F_5$, $R^1$ and $R^2$ are methyl and $R^3$ is hydrogen.

7. The compound of claim 1, wherein R is difluoromethyl, $R^1$ and $R^2$ are methyl and $R^3$ is hydrogen.

8. The compound of claim 1, wherein R is trifluoroethyl, and $R^1$, $R^2$ and $R^3$ are methyl.

9. The compound of claim 1, wherein R is $ClF_2C$, $R^1$ and $R^2$ are methyl, and $R^3$ is hydrogen.

10. The compound of claim 1, wherein R is t-butyl, $R^1$ and $R^2$ are methyl and $R^3$ is hydrogen.

References Cited

Saikawa et al.: Chem. Abstracts, 73:77289r (1970).

RICHARD J. GALLAGHER, Primary Examiner

U.S. Cl. X.R.

71—88, 90, 92, 94, 95; 260—240 G, 293.68, 294.8 D, 307 G